US008521384B2

(12) United States Patent
O'Connor et al.

(10) Patent No.: US 8,521,384 B2
(45) Date of Patent: Aug. 27, 2013

(54) TURF MAINTENANCE VEHICLE ALL-WHEEL DRIVE SYSTEM

(75) Inventors: Sean C. O'Connor, Charlotte, NC (US); Gregory Merriweather, Charlotte, NC (US); Harry L. Derby, V, Charlotte, NC (US); Martin M. Carlson, Tega Cay, SC (US); Kenneth R. Wilson, Stanley, NC (US)

(73) Assignee: Textron Innovations Inc., Providence, RI (US)

( * ) Notice: Subject to any disclaimer, the term of this patent is extended or adjusted under 35 U.S.C. 154(b) by 785 days.

(21) Appl. No.: 12/360,410

(22) Filed: Jan. 27, 2009

(65) Prior Publication Data

US 2009/0192691 A1 Jul. 30, 2009

Related U.S. Application Data

(60) Provisional application No. 61/024,008, filed on Jan. 28, 2008.

(51) Int. Cl.
*G06F 7/00* (2006.01)
*G06F 17/00* (2006.01)
*G06F 19/00* (2011.01)

(52) U.S. Cl.
USPC ............ 701/69; 701/48; 701/50; 701/71; 701/72; 701/82; 180/117; 180/118; 180/197; 56/10.6; 56/10.8; 56/11.1; 76/82.1

(58) Field of Classification Search
USPC ............ 701/22, 36, 48, 50, 69–72, 81–82, 701/90, 91; 180/117, 118, 167, 178, 179, 180/197, 200; 56/10.6, 10.8, 11.1; 76/82, 76/82.1
See application file for complete search history.

(56) References Cited

U.S. PATENT DOCUMENTS

| 1,401,156 A | 12/1921 | Jenkins |
| 2,417,613 A | 3/1947 | Radabaugh |

(Continued)

FOREIGN PATENT DOCUMENTS

| EP | 589516 | 3/1994 |
| EP | 1508266 A2 | 2/2005 |

(Continued)

OTHER PUBLICATIONS

European Search Report for European Application No. EP09151562 dated May 28, 2009.

(Continued)

*Primary Examiner* — Rami Khatib
(74) *Attorney, Agent, or Firm* — Harness, Dickey & Pierce, P.L.C.

(57) ABSTRACT

A turf maintenance vehicle all-wheel drive traction control system includes a primary wheel propelling the vehicle. A first motor rotates the primary wheel. A traction control system has a first portion communicating with the first motor to monitor either a first motor current demand or a rotational speed of the primary wheel or the first motor and generates a traction control value. A secondary wheel rotated by a second motor steers the vehicle in a vehicle non-slip condition. A traction control system second portion determines a secondary wheel steering angle value. A speed threshold limit stored in the traction control system compared to the traction control value generates a slippage occurrence message indicative of a primary wheel traction loss event. A second motor drive signal created by comparing the steering angle value and the slippage occurrence message energizes the second motor during the traction loss event.

17 Claims, 8 Drawing Sheets

(56) References Cited

U.S. PATENT DOCUMENTS

| | | | |
|---|---|---|---|
| 2,523,014 A | 9/1950 | Gooch | |
| 2,702,448 A | 2/1955 | Smith | |
| 2,904,905 A * | 9/1959 | Armington | 37/417 |
| 3,090,184 A | 5/1963 | Hadek | |
| 3,103,090 A | 9/1963 | Campbell | |
| 3,106,811 A | 10/1963 | Heth et al. | |
| 3,217,824 A | 11/1965 | Jepson | |
| 3,230,695 A | 1/1966 | West | |
| 3,339,353 A | 9/1967 | Schreyer | |
| 3,404,518 A | 10/1968 | Kasper | |
| 3,425,197 A | 2/1969 | Kita | |
| 3,429,110 A | 2/1969 | Strasel | |
| 3,472,005 A | 10/1969 | Profenna | |
| 3,496,706 A | 2/1970 | Mattson | |
| 3,511,033 A | 5/1970 | Strasel | |
| 3,570,226 A | 3/1971 | Haverkamp et al. | |
| 3,572,455 A | 3/1971 | Brueske | |
| 3,581,480 A | 6/1971 | O'Connor, III et al. | |
| 3,602,772 A | 8/1971 | Hundhausen et al. | |
| 3,603,065 A | 9/1971 | Weber | |
| 3,608,284 A | 9/1971 | Erdman | |
| 3,608,285 A | 9/1971 | Berk | |
| 3,612,573 A | 10/1971 | Hoffman | |
| 3,613,337 A | 10/1971 | Akgulian et al. | |
| 3,631,659 A | 1/1972 | Horowitz | |
| 3,641,749 A | 2/1972 | Dwyer, Jr. et al. | |
| 3,650,097 A | 3/1972 | Nokes | |
| 3,668,499 A | 6/1972 | Malloy | |
| 3,668,844 A | 6/1972 | Akgulian et al. | |
| 3,668,884 A | 6/1972 | Nebgen | |
| 3,696,593 A | 10/1972 | Thorud et al. | |
| 3,698,523 A | 10/1972 | Bellinger | |
| 3,721,076 A | 3/1973 | Behrens | |
| 3,729,912 A | 5/1973 | Weber | |
| 3,731,469 A | 5/1973 | Akgulian et al. | |
| 3,732,671 A | 5/1973 | Allen et al. | |
| 3,732,673 A | 5/1973 | Winn, Jr. | |
| 3,742,685 A | 7/1973 | Lian et al. | |
| 3,759,019 A | 9/1973 | Wells | |
| 3,796,277 A | 3/1974 | Gordon | |
| 3,800,480 A | 4/1974 | Keating | |
| 3,809,975 A | 5/1974 | Bartels | |
| 3,832,835 A | 9/1974 | Hall et al. | |
| 3,841,069 A | 10/1974 | Weck | |
| 3,895,481 A | 7/1975 | Olney et al. | |
| 3,910,016 A | 10/1975 | Saiia et al. | |
| 3,918,240 A | 11/1975 | Haffner et al. | |
| 3,924,389 A | 12/1975 | Kita | |
| 3,958,398 A | 5/1976 | Fuelling, Jr. et al. | |
| 3,992,858 A | 11/1976 | Hubbard et al. | |
| 3,999,643 A | 12/1976 | Jones | |
| 4,021,996 A | 5/1977 | Bartlett et al. | |
| 4,024,448 A | 5/1977 | Christianson et al. | |
| 4,048,366 A | 9/1977 | Kingsbury | |
| 4,064,680 A | 12/1977 | Fleigle | |
| 4,145,864 A | 3/1979 | Brewster, Jr. | |
| 4,161,858 A | 7/1979 | Gerrits | |
| 4,180,964 A | 1/1980 | Pansire | |
| 4,265,146 A | 5/1981 | Horrell | |
| 4,301,881 A | 11/1981 | Griffin | |
| 4,306,402 A | 12/1981 | Whimp | |
| 4,306,404 A | 12/1981 | Szymanis et al. | |
| 4,307,559 A | 12/1981 | Jupp et al. | |
| 4,312,421 A | 1/1982 | Pioch | |
| 4,318,266 A | 3/1982 | Taube | |
| 4,330,981 A | 5/1982 | Hall et al. | |
| 4,333,302 A | 6/1982 | Thomas et al. | |
| 4,335,569 A | 6/1982 | Keeney et al. | |
| 4,351,557 A | 9/1982 | Chary | |
| 4,354,569 A | 10/1982 | Eichholz | |
| 4,370,846 A | 2/1983 | Arnold | |
| 4,395,865 A | 8/1983 | Davis, Jr. et al. | |
| 4,423,794 A | 1/1984 | Beck | |
| 4,430,604 A | 2/1984 | Loganbill et al. | |
| 4,479,346 A | 10/1984 | Chandler | |
| 4,487,006 A | 12/1984 | Scag | |
| 4,522,165 A | 6/1985 | Ogawa | |
| 4,559,768 A | 12/1985 | Dunn | |
| 4,562,589 A | 12/1985 | Warnaka et al. | |
| 4,589,249 A | 5/1986 | Walker et al. | |
| 4,642,976 A | 2/1987 | Owens | |
| 4,663,920 A | 5/1987 | Skovhoj | |
| 4,667,460 A | 5/1987 | Kramer | |
| 4,686,445 A | 8/1987 | Phillips | |
| 4,753,318 A | 6/1988 | Mizuno et al. | |
| 4,756,375 A | 7/1988 | Ishikura et al. | |
| 4,770,595 A | 9/1988 | Thompson et al. | |
| 4,815,259 A | 3/1989 | Scott | |
| 4,866,917 A | 9/1989 | Phillips et al. | |
| 4,870,811 A | 10/1989 | Steele | |
| 4,882,896 A | 11/1989 | Wilcox | |
| 4,893,688 A | 1/1990 | Morishita | |
| 4,897,013 A | 1/1990 | Thompson et al. | |
| 4,920,733 A | 5/1990 | Berrios | |
| 4,930,592 A | 6/1990 | Ohmura | |
| 4,943,758 A | 7/1990 | Tsurumiya | |
| 4,949,265 A * | 8/1990 | Eguchi et al. | 701/42 |
| 4,964,265 A | 10/1990 | Young | |
| 4,964,266 A | 10/1990 | Kolb | |
| 4,967,543 A | 11/1990 | Scag et al. | |
| 4,987,729 A | 1/1991 | Paytas | |
| 4,995,227 A | 2/1991 | Foster | |
| 5,042,236 A | 8/1991 | Lamusga et al. | |
| 5,042,239 A | 8/1991 | Card | |
| 5,062,322 A | 11/1991 | Sinko | |
| 5,069,022 A | 12/1991 | Vandermark | |
| 5,085,043 A | 2/1992 | Hess et al. | |
| 5,097,923 A | 3/1992 | Ziegler et al. | |
| 5,101,922 A | 4/1992 | Ohmura | |
| 5,123,234 A | 6/1992 | Harada et al. | |
| 5,133,174 A | 7/1992 | Parsons, Jr. | |
| 5,135,066 A | 8/1992 | Kashihara | |
| 5,140,249 A | 8/1992 | Linder et al. | |
| 5,150,021 A | 9/1992 | Kamono et al. | |
| 5,163,273 A | 11/1992 | Wojtkowski et al. | |
| 5,203,147 A | 4/1993 | Long | |
| 5,204,814 A | 4/1993 | Noonan et al. | |
| 5,253,729 A | 10/1993 | Suzuki | |
| 5,261,213 A | 11/1993 | Humphrey | |
| 5,301,494 A | 4/1994 | Peot et al. | |
| 5,309,699 A | 5/1994 | Ehn, Jr. | |
| 5,319,368 A | 6/1994 | Poholek | |
| 5,323,593 A | 6/1994 | Cline et al. | |
| 5,330,138 A | 7/1994 | Schlessmann | |
| 5,343,680 A | 9/1994 | Reichen et al. | |
| 5,406,778 A | 4/1995 | Lamb et al. | |
| 5,415,245 A | 5/1995 | Hammond | |
| 5,459,984 A | 10/1995 | Reichen et al. | |
| 5,482,135 A | 1/1996 | Phillips et al. | |
| 5,540,037 A | 7/1996 | Lamb et al. | |
| 5,692,053 A | 11/1997 | Fuller et al. | |
| 5,794,422 A | 8/1998 | Reimers et al. | |
| 5,845,236 A | 12/1998 | Jolly et al. | |
| 5,934,053 A | 8/1999 | Fillman et al. | |
| 6,039,009 A | 3/2000 | Hirose | |
| 6,044,922 A | 4/2000 | Field | |
| 6,082,084 A | 7/2000 | Reimers et al. | |
| 6,449,934 B1 | 9/2002 | Reimers et al. | |
| 6,491,133 B2 | 12/2002 | Yamada et al. | |
| 6,523,334 B1 | 2/2003 | Dettmann | |
| 6,604,348 B2 | 8/2003 | Hunt | |
| 6,644,004 B2 | 11/2003 | Reimers et al. | |
| 6,857,253 B2 | 2/2005 | Reimers et al. | |
| 2004/0168420 A1 | 9/2004 | Fillman et al. | |
| 2005/0230168 A1 | 10/2005 | Fillman et al. | |
| 2006/0108956 A1* | 5/2006 | Clark et al. | 318/139 |
| 2006/0260359 A1 | 11/2006 | Kasten et al. | 180/247 |
| 2007/0278023 A1* | 12/2007 | Masut et al. | 180/65.5 |
| 2008/0289309 A1* | 11/2008 | Gust et al. | 56/11.9 |

FOREIGN PATENT DOCUMENTS

| | | |
|---|---|---|
| EP | 1541446 | 6/2005 |
| EP | 1655830 | 5/2006 |
| EP | 1881596 | 1/2008 |

| | | |
|---|---|---|
| JP | 5328814 | 12/1993 |
| JP | 8242506 A | 9/1996 |
| JP | 10083189 | 3/1998 |
| JP | 2000309230 A | 11/2000 |
| JP | 2001106042 | 4/2001 |
| JP | 2002233006 A | 8/2002 |
| JP | 2004096825 A | 3/2004 |
| JP | 200730864 A | 2/2007 |
| JP | 2007230366 A | 9/2007 |
| WO | WO-00/08913 | 2/2000 |

OTHER PUBLICATIONS

Japanese Notification of Reason for Refusal for Japanese Patent Application No. 2009-017364, dated Jul. 17, 2012, and English translation thereof.

* cited by examiner

TURF MAINTENANCE VEHICLE ALL-WHEEL DRIVE SYSTEM

CROSS-REFERENCE TO RELATED APPLICATIONS

This application claims the benefit of U.S. Provisional Application No. 61/024,008, filed on Jan. 28, 2008. The entire disclosure of the above application is incorporated herein by reference.

FIELD

The present disclosure relates to a drive system for and method for operating a turf maintenance system vehicle.

BACKGROUND

The statements in this section merely provide background information related to the present disclosure and may not constitute prior art.

Wheeled turf maintenance vehicles are commonly used to cut fairway grass or lawns, and more precisely maintain grass height of golf course greens. At least one wheel is normally powered by a power unit such as an engine or battery pack associated with the turf maintenance vehicle. The powered wheel or wheels can slip under certain circumstances which can cause damage to the turf.

Systems have therefore been developed such as hydraulically operated systems which can redistribute drive power from the power unit to a normally non-driven wheel to recover from the slip. These systems often require complicated sensing devices which operate by measuring a vehicle ground speed, comparing the ground speed to a rotational speed of the driven wheel to identify a slip condition, and reacting to transfer power to the normally non-driven wheel. The normally non-driven wheel can therefore slip or drag if the amount of power delivered to the normally non-driven wheel is incorrect. This condition can be exacerbated if the normally non-driven wheel is a steering wheel for the vehicle.

SUMMARY

According to several embodiments of the present disclosure, an all-wheel drive traction control system for a turf maintenance vehicle includes at least one primary wheel operating to propel the turf maintenance vehicle. A first motor operates to rotate the primary wheel. A traction control system is in communication with the first motor. At least one secondary wheel is operable to steer the turf maintenance vehicle. A second motor is energized to rotate the secondary wheel. A current flow to at least one of the first motor is temporarily decreased and the second motor is temporarily increased by the traction control system in response to a wheel slip condition of the primary wheel.

According to additional embodiments, a speed threshold limit is stored in the traction control system. When the speed threshold limit is exceeded when compared to the first signal by a predetermined value, the traction control system generates a slippage occurrence message indicative of a slip event of the primary wheel.

According to other embodiments, an all-wheel drive traction control system for a turf maintenance vehicle includes at least one continuously-driven primary wheel operating to propel the turf maintenance vehicle. A first motor operates to rotate the primary wheel. A traction control system has a first portion in communication with the first motor, the traction control system operating to monitor a first signal. At least one secondary wheel is operable to steer the turf maintenance vehicle. A second motor is energized to rotate the secondary wheel. A second portion of the traction control system operating to monitor a steering angle value of the secondary wheel and a second signal. A speed threshold limit is stored in the traction control system. The traction control system operably compares the first signal to the speed threshold limit and when the speed threshold limit is exceeded by a predetermined amount a slippage occurrence message indicative of a slip event of the primary wheel is generated. At least one of a current to the first motor is operably decreased and a current to the second motor is operably increased during the slip event.

The all-wheel drive traction control system can further include a first signal from the first motor monitored by the traction control system. A steering angle value of the secondary wheel can operate as an input to the traction control system. A predetermined speed threshold limit can be saved in the traction control system. The traction control system is operable to compare the first signal to the predetermined speed threshold limit to determine occurrence of the wheel slip condition of the primary wheel. The traction control system is operable to perform at least one of increasing the current to the second motor and decreasing the current to the first motor to recover from the wheel slip condition.

A second signal from the second motor can be monitored by the traction control system. The traction control system is operable to compare the first signal to the second signal to determine occurrence of the wheel slip condition of the primary wheel. The traction control system is operable to perform at least one of increasing the current to the second motor and decreasing the current to the first motor to recover from the wheel slip condition.

According to further embodiments, an all-wheel drive traction control system for a turf maintenance vehicle can include at least one continuously-driven primary wheel operating to propel the turf maintenance vehicle, and a first motor operating to rotate the primary wheel, a traction control system having a first portion in communication with the first motor, the traction control system operating to monitor a first signal. At least one secondary wheel is operable to steer the turf maintenance vehicle. A second motor is energized to rotate the secondary wheel. A second portion of the traction control system operates to monitor a steering angle value of the secondary wheel and a second signal. A speed threshold limit can be stored in the traction control system. The traction control system is operable to compare the first signal to the speed threshold limit and when the speed threshold limit is exceeded by a predetermined amount a slippage occurrence message indicative of a slip event of the primary wheel is generated. The traction control system is operable to perform at least one of increasing the current to the second motor and decreasing the current to the first motor during the slip event.

The all-wheel drive traction control system can further include a power steering control unit operating to control steering motion of the secondary wheel and to receive the steering angle value. A steering control motor in electrical communication with the power steering control unit and mechanically connected to the secondary wheel is operative to receive a steering control signal from the power steering control unit and to physically direct the steering motion of the secondary wheel. A throttle control system in communication with the traction control system can operate to advance or retard an operating speed of the first motor. A generator set can operate to create an electrical power transferable through a vehicle bus to energize the first and second motors and the traction control system. The current to the second motor decreases as the steering angle value decreases to a null position, and increases as the steering angle value increases with respect to the null position. The at least one primary wheel comprises first and second driven wheels rotatably connected to the first motor by a differential. The first signal can be a first motor current demand. The first signal can also be an acceleration rate of the first motor. The second signal can be a second motor current demand. The second signal can also be an acceleration rate of the second motor.

Further areas of applicability will become apparent from the description provided herein. It should be understood that the description and specific examples are intended for purposes of illustration only and are not intended to limit the scope of the present disclosure.

DRAWINGS

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

Figure 1:
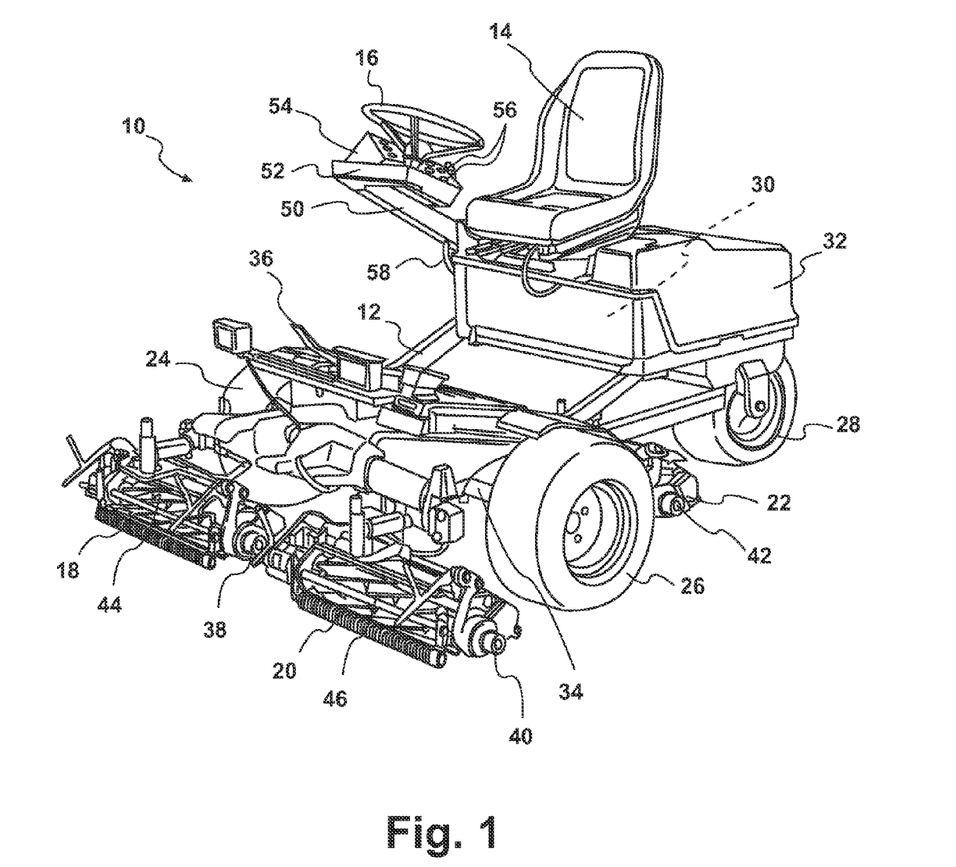
FIG. 1 is a perspective view of a turf maintenance vehicle having an all-wheel drive system.

Referring generally to FIG. 1 and according to various embodiments, in a first configuration a turf maintenance vehicle 10 includes a frame 12 supporting a seat 14 operable to support an operator, a steering device 16 such as a steering wheel, and a plurality of cutting units 18, 20, 22 supported by frame 12. Cutting units 18, 20, 22 are shown as reel blade units, however the cutting units can be other types including rotary cutting units, or may be any type of implements operated during turf care operations, including, by way of example, cutting units, rakes, groomers, and the like. Primary, or first and second drive wheels 24, 26 used to propel turf maintenance vehicle 10 are connected to frame 12. Secondary or steerable wheel 28 used to both propel and steer turf maintenance vehicle 10 are also connected to frame 12. According to additional embodiments (not shown) two or more secondary or steerable wheels 28 can be provided. A power unit 30 is connected to frame 12 which can be provided with a cover 32. Power unit 30 provides power to rotate first and second drive wheels 24, 26 via at least one axle shaft 34. A throttle control device 36, which can be actuated by a foot controlled pedal is provided to control a forward or reverse speed or to stop turf maintenance vehicle 10.

Power unit 30 can be electrically coupled to each of a plurality of electric motors 38, 40, 42 each connected to one of the plurality of first, second and third cutting units 18, 20, 22. Electric motors 38, 40, 42 provide the rotating drive force to operate a plurality of first, second and third reel blade assemblies 44, 46, 48 rotatably mounted to individual ones of first, second and third cutting units 18, 20, 22 (third reel blade assembly 48 of third cutting unit 22 is not clearly visible in this view). In additional embodiments, not shown, first, second and third cutting units 18, 20, 22 can be rotary blade cutting units.

A support arm 50 can be connected to frame 12 to provide a support member 52 for mounting steering device 16. Support member 52 can be adjustably supported from support arm 50 to allow operator adjustment of the position of steering device 16. A control unit 54 can be mounted on support arm 50 proximate to seat 14. Control unit 54 can provide a plurality of switches 56 to assist the operator in selecting operating parameters of turf maintenance vehicle 10 such as grass cutting height, reel blade assembly or rotary blade rotating speed, and operation of items such as lights. A power bus 58 distributes electrical power throughout turf maintenance vehicle 10 from power unit 30.

Figure 2:
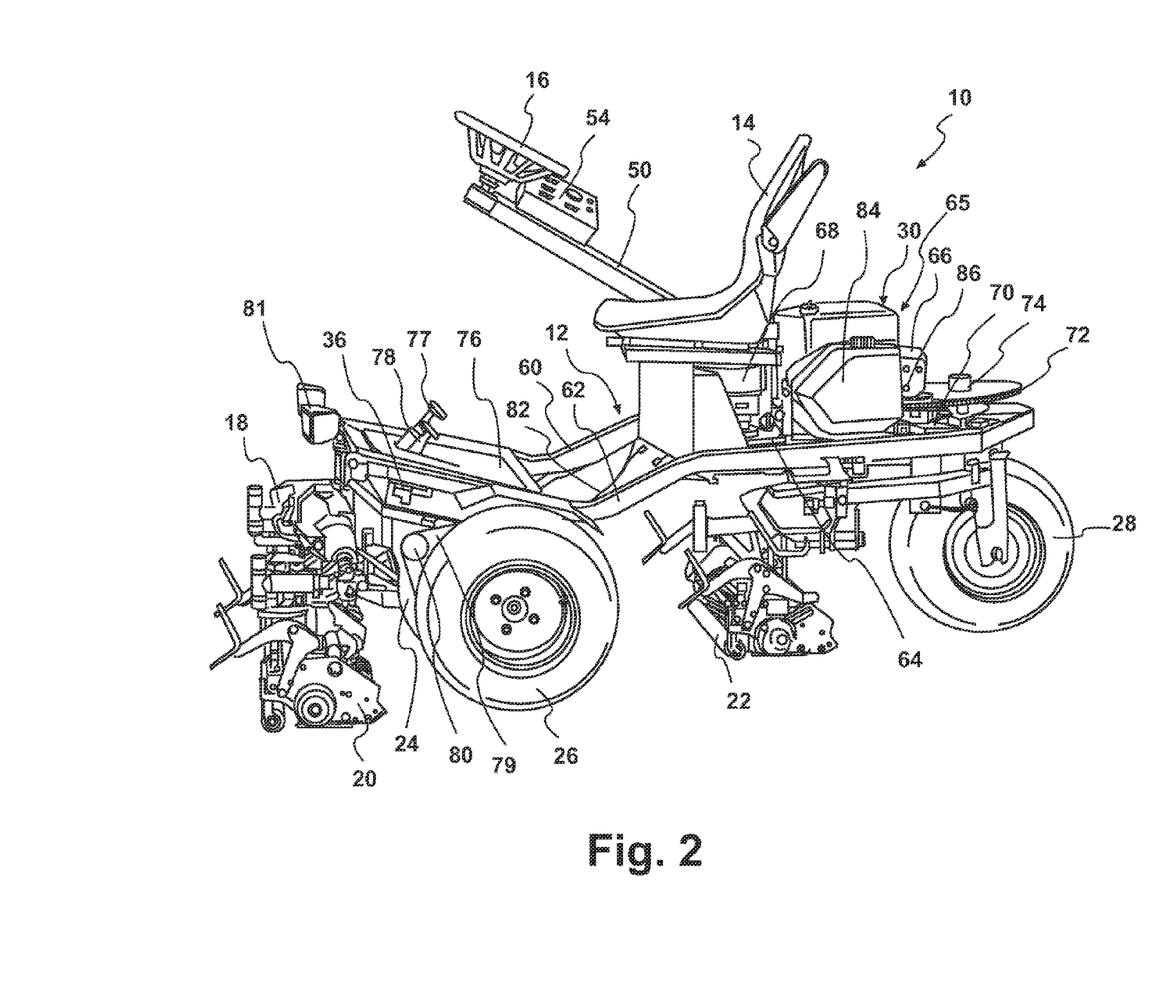
FIG. 2 is a side elevational perspective view of the turf maintenance vehicle of FIG. 1 with a power unit cover removed for clarity.

Referring next to FIG. 2, frame 12 further includes a frame first member 60 and a frame second member 62. A power unit support member 64 is connectable between frame first and second members 60, 62. Power unit support member 64 supports power unit 30 which in one aspect of the disclosure is an engine 65 having a reciprocating engine 66 such as a gasoline or a diesel engine, or a rotary engine. Engine 65 provides rotating power to drive a generator 68 to generate electrical power. According to several embodiments, an output voltage of approximately 48 Volts DC is provided by generator 68.

A drive unit 70 can be separately supported from power unit support member 64, and receives electrical power from power unit 30. In some embodiments drive unit 70 is an electric steering motor which is electrically connectable to steering device 16 and rotates steerable wheel 28 in response to a specific rotation angle of steering device 16. A chain 72 driven by drive unit 70 can also be used to rotate a gear assembly 74 to rotate steerable wheel 28 when drive unit 70 receives electrical steering signals from steering device 16. Drive unit 70 and gear assembly 74 can be separately supported to frame 12 from first power unit support member 64 to allow maintenance of the components of power unit 30 without removal of drive unit 70 or gear assembly 74.

In other embodiments, drive unit 70 can be replaced with a mechanical or linkage drive system (not shown). Determination of the specific rotation angle of steering device 16 can still be obtained from an electric signal generated by one or more sensors connected to the mechanical or linkage drive system. The mechanical or linkage drive system is connected to steerable wheel 28 in these embodiments. Gear assembly 74 can be eliminated in these embodiments unless it is desirable to provide increased operating torque to turn steerable wheel 28.

Turf maintenance vehicle 10 can also include a foot support structure 76, which supports throttle control device 36 having in several embodiments an accelerator pedal 77 and a brake pedal 78 acting as a brake and/or parking brake pedal. Referring to FIG. 2 and again to FIG. 1, a differential 79 is coupled to axle shaft 34 to rotatably drive first and second drive wheels 24, 26. A first electric motor 80 is coupled to differential 79. Rotation of a shaft (not shown) of first electric motor 80 provides the drive input to differential 79. Power unit 30 provides electrical power to all the electrically operated equipment of turf maintenance vehicle 10 including first, second and third electric motors 38, 40, 42, control unit 54, steering device 16, throttle control device 36, first electric motor 80, and to one or more headlights 81 via a wiring harness 82 of bus 58. For the embodiment shown having reciprocating engine 66 and generator 68 for power unit 30, reciprocating engine 66 is supplied with fuel from a fuel tank 84 supported by power unit support member 64 and with filtered air via an air filter 86.

Referring generally to FIG. 3 and again to FIG. 2, the components supported by power unit support member 64 are more clearly seen. Support arm 50 can be fixedly or rotatably supported to frame 12. A power steering control unit 88 is electrically connected between steering device 16 and drive unit 70. Power steering control unit 88 receives electrical control signals from steering device 16 and converts these signals to displacement signals operable to rotate a shaft of drive unit 70 either counterclockwise or clockwise to rotate a yoke 89 connected to steerable wheel 28. A second electric motor 90 is supported from yoke 89 and is rotatably coupled to steerable wheel 28. Electrical power from power unit 30 is provided to second electric motor 90 by a flexible power/data transfer line 92. Rotation of steerable wheel 28 by drive unit 70 is either mechanically or electrically limited to prevent damage to power/data transfer line 92.

Figure 4:
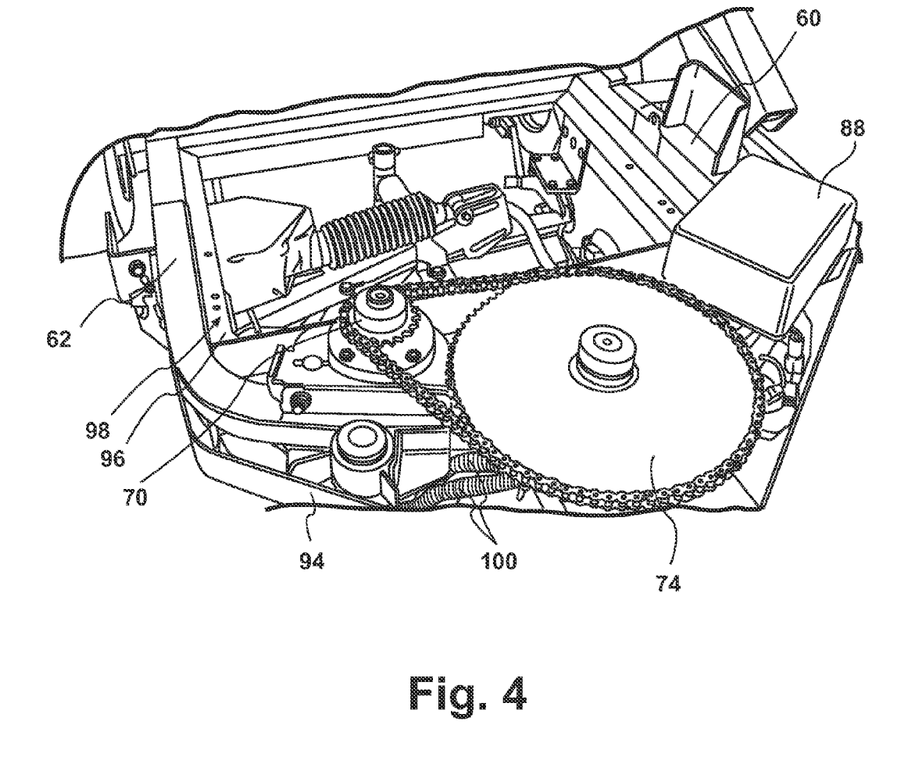
FIG. 4 is the rear perspective view of the turf maintenance vehicle of FIG. 3 with the power unit removed for clarity.

As best seen in reference to FIG. 4, with power unit 30 and power unit support member 64 removed for clarity, a rear frame section 94 is shown connected such as by welding or fastening to distally extending ends of each of first and second frame members 60, 62. Power unit support member 64 (not shown in this view) seats partially within and is supported by a receiving member which in some embodiments is a rectangular-shaped frame section 96 defining a support surface 98. Drive unit 70, gear assembly 74, and power steering control unit 88 can be independently supported with respect to power unit 30 and can therefore be separately supported by frame 12. A plurality of wiring harnesses 100 supply electrical power and signal transmission lines to items such as drive unit 70 and power steering control unit 88. The arrangement of FIG. 4 and the subsequent embodiment of FIG. 5, including the ability to remove power unit 30 and power unit support member 64 are disclosed in U.S. patent application Ser. No. 11/265,224, entitled "MODULAR POWER SOURCE FOR RIDING MOWER", filed Nov. 1, 2005, commonly owned by the assignee of the present disclosure, the subject matter of which is incorporated herein by reference.

Figure 3:
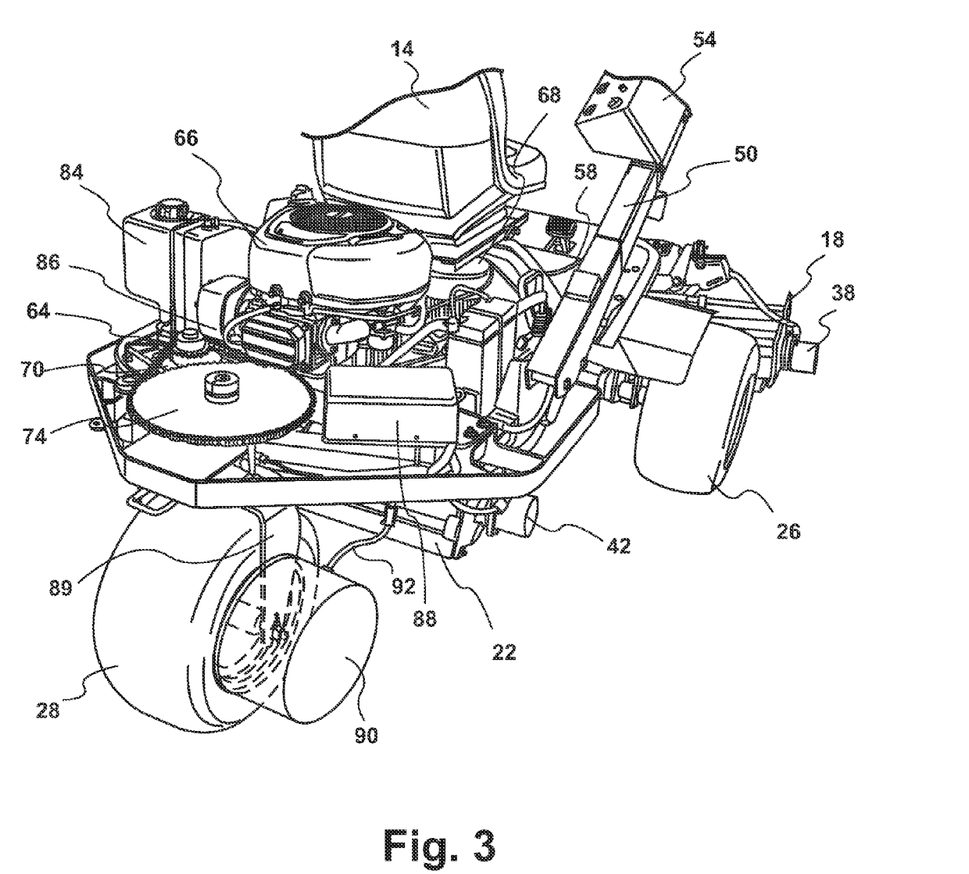
FIG. 3 is a rear perspective view of the turf maintenance vehicle of FIG. 1 showing a motor/generator power unit installed together with a steerable wheel drive motor.

Referring now to FIG. 5 and again to FIG. 4, according to various embodiments, power unit 30 can also be configured as a battery unit 102 having a plurality of batteries 104 each producing a DC voltage and current. Batteries 104 are collectively supported on a frame 106 which is dimensionally equivalent to power unit support member 64 and therefore supportable on support surface 98 of rectangular-shaped frame section 96. A combined output voltage of approximately 48 Volts DC is provided by battery unit 102. In various embodiments, each of the batteries 104 are electrically coupled in series/parallel configuration, or various alternative configurations thereof, and jointly connected to power bus 58 using a connector 108. In various embodiments, a generator such as generator 68 shown in FIG. 3 is not required when battery unit 102 is used.

Figure 5:
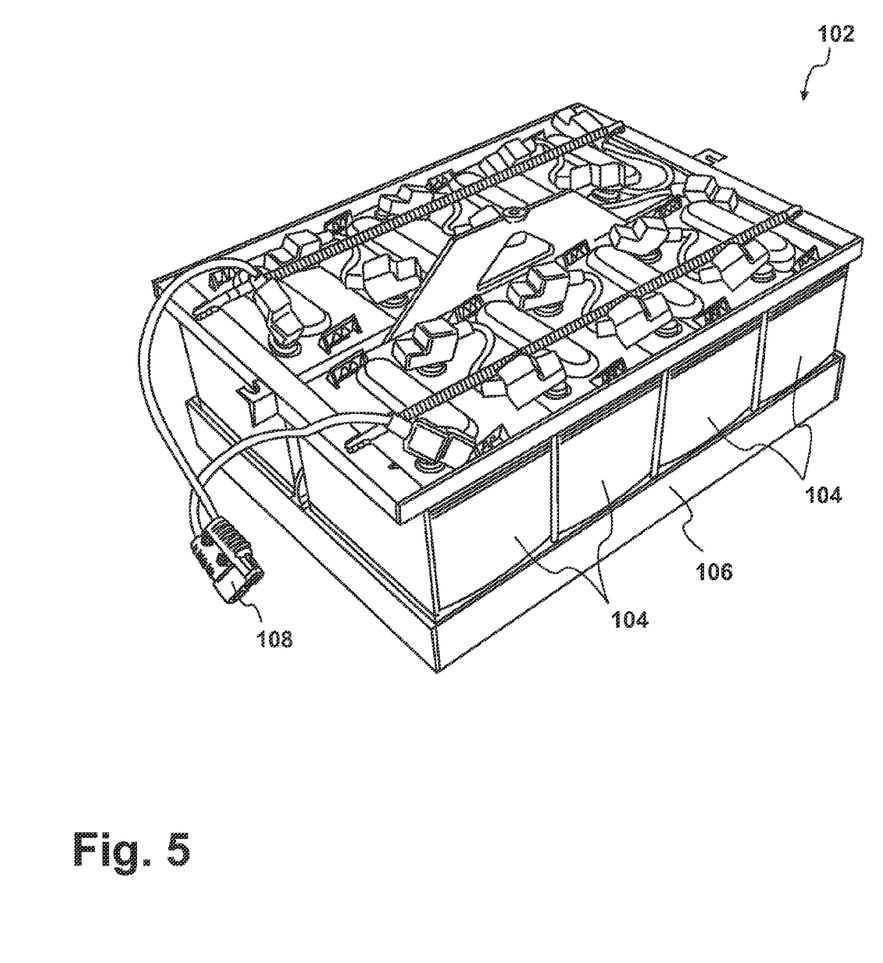
FIG. 5 is a perspective view of a modular power source including a plurality of batteries creating a battery unit.

Referring to both FIGS. 1 and 5, power unit 30 and battery unit 102 can also be replaced with other energy sources. These can include but are not limited to fuel cell(s) use and also alternate energy storage devices including capacitors or solar panels if the motor current demand is within the output range of these devices. In addition, an alternator can be used in place of generator 68. The present disclosure is therefore not limited by the embodiment of the power source used.

Figure 6:
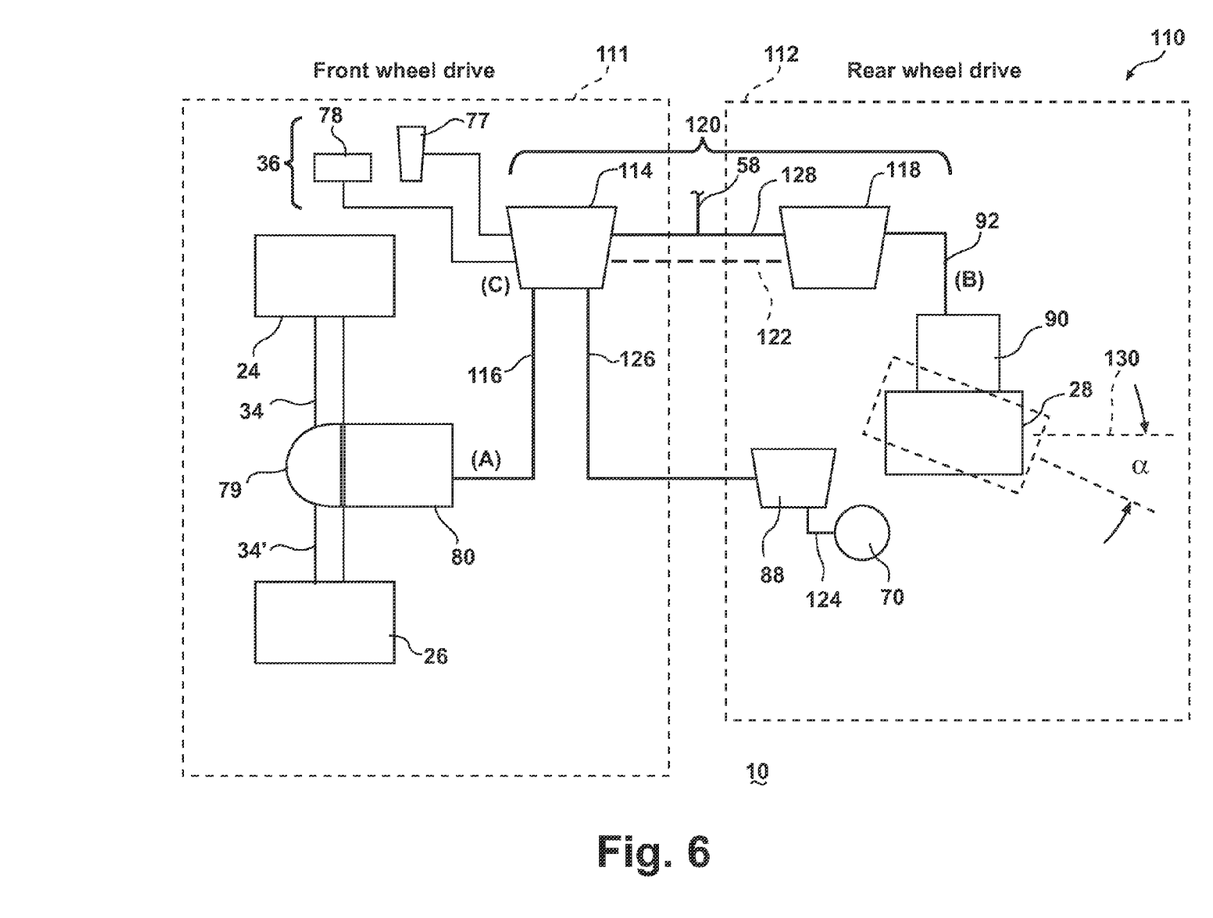
FIG. 6 is a diagram of the all-wheel drive system components of the present disclosure.

Referring to FIG. 6, an all-wheel drive traction control system 110 for turf maintenance vehicle 10 includes a front wheel drive portion 111 and a rear wheel drive portion 112. Front wheel drive portion 111 includes first and second drive wheels 24, 26 rotatably driven by axle shafts 34, 34' which are connected to differential 79. Differential 79 is driven by first electric motor 80 which receives electrical power from and transfers operating data to and from a primary or first traction control unit 114 via a power/data transfer line 116. First traction control unit 114 together with a secondary or second traction control unit 118 associated with rear wheel drive portion 112 can both be provided in a single unit identified as a traction control unit TCU 120. Front wheel drive portion 111 also includes accelerator and brake pedals 77, 78 of throttle control device 36, which provides signals representing the position or position change of accelerator and brake pedals 77, 78 to first traction control unit 114.

Rear wheel drive portion 112 of all-wheel drive traction control system 110 includes steerable wheel 28 and second motor 90, which receives electrical power from and transfers operating data to and from second traction control unit 118 via power/data transfer line 92. A data transfer or bus, such as a controller area network (CAN) bus 122 can be provided allowing communication of data between first and second traction control units 114, 118 if first and second traction control units 114, 118 are spatially separated units. Rear wheel drive portion 112 also includes drive unit 70 which receives electrical power from and transfers operating data to and from power steering control unit 88 via a power/data transfer line 124. Power steering control unit 88 receives electrical power from and transfers operating data to and from first traction control unit 114 via a power/data transfer line 126. Both first and second traction control units of TCU 120 receive electrical power from power bus 58 via a power supply line 128.

All-wheel drive traction control system 110 functions as follows. Initially, electrical current is provided to first motor 80 to drive differential 79 and first and second driven wheels 24, 26 during a non-slip condition. A first signal "A" such as a current demand value of first motor 80 or a first motor rotational acceleration value is forwarded by power/data transfer line 116 to first traction control unit 114. First traction control unit 114 monitors the value of first signal "A". A second signal "B" such as a current demand value of second motor 90 or a second motor rotational acceleration value is forwarded by power/data transfer line 92 to second traction control unit 118. Second traction control unit 118 monitors the value of second signal "B". A speed threshold limit "C" is stored in TCU 120. TCU 120 determines when a speed difference "ΔS" between the speed provided as first signal "A" of first motor 80 and the speed threshold limit "C" occurs (ΔS=SPEED A−C). When TCU 120 detects speed difference "ΔS" is higher than a pre-determined value "V" (ΔS>V), TCU 120 identifies that a slip event is occurring and will record a degree of slip. In various embodiments, a signal indicating an acceleration change rate over a predetermined period of time of first motor 80 compared to a threshold value can also be used in place of speed difference "ΔS" to determine a slip condition.

The power steering control unit 88 is then queried for a value of a steering angle a of steerable wheel 28. Steering angle a is determined as an angle of wheel rotation measured from a non-rotated or null reference line 130 and can be obtained as an electrical signal from power steering control unit 88 based on sensor signals received from rotation of steering device 16. TCU 120 creates a slippage occurrence message and then calculates an increased current value to supply to second motor 90 which includes in the calculation the steering angle α, and a reduced current value to supply to first motor 80 which will reduce or eliminate the slip condition. TCU 120 retrieves power from power bus 58 to increase current flow to second motor 90, decreases current flow to first motor 80, and continues to vary the current delivered to both first motor 80 and second motor 90 until the slip event ends, for example when $\Delta S \leq V$.

Steering angle α is used in the system to recover from the slip event because increasing the current (or torque) of second motor 90 when second motor 90 is rotated reduces the effectiveness of traction control system 110 by undesirably increasing a rate of turn for turf maintenance vehicle 10 and/or because steerable wheel 28 can spin or lose traction when turned out of alignment from first and second driven wheels 24, 26. During a "normal" operation of turf maintenance vehicle 10, defined as operation in a non-slip condition, first and second driven wheels 24, 26 are positively driven with power output from first motor 80. Also during normal operation, current is delivered continuously to continuously energize second motor 90, so that a rotational speed of steerable wheel 28 substantially matches the rotational speed of first and second driven wheels 24, 26. This is defined as a "neutral traction state". This prevents steerable wheel 28 from dragging or slipping with respect to a ground surface which would tend to reverse rotate second motor 90 due to the friction or "back drive" of second motor 90. Steerable wheel 28 speed is also controlled to prevent rotation faster than first and second driven wheels 24, 26 as this would load both first and second motors 80, 90 undesirably. Traction control system 110 is therefore continuously in an "all-wheel-drive mode" when operating in a forward or reverse direction. The increased current delivered to second motor 90 during a slip event is therefore temporary and continues only until the slip event ends.

In other embodiments, second signal "B" can be used by TCU 120. When TCU 120 detects a speed difference "ΔS1" of the speed (or acceleration change rate) provided as signal "A" of first motor 80 higher than a pre-determined value between signal "A" and the speed (or acceleration change rate) provided as second signal "B" of second motor 90, TCU 120 identifies that a slip event is occurring and will record a degree of slip. As also identified above, the power steering control unit 88 is then queried for the value of the steering angle α of steerable wheel 28. TCU 120 then creates a slippage occurrence message and then calculates an increased current value to supply to second motor 90 which includes in the calculation the steering angle α, and a reduced current value to supply to first motor 80 which will eliminate the slip condition.

During normal operation, which can also include operation when some wheel slippage is occurring which is below the predetermined threshold conditions described above, TCU 120 does not send the slippage occurrence message and additional power is not supplied to steerable wheel 28. Steerable wheel 28 therefore will remain in the neutral traction state. Also, if differential 79 is a limited slip or clutched differential allowing wheel rotational speed differences between first and second driven wheels 24, 26, the impact on traction control system 110 is minimal, because the speed or acceleration rate of first motor 80, and not the individual wheel speed differences between first and second driven wheels 24, 26 are used by traction control system 110.

In other embodiments, second signal "B" and the speed of steerable wheel 28 can be used by TCU 120 to set or determine a speed of first and second driven wheels 24, 26. When TCU 120 detects a speed difference "ΔS2" of the speed (or acceleration change rate) provided as a signal "B1" of second motor 90 lower than a pre-determined value between signal B1 and a signal "A1" of first motor 80, TCU 120 identifies that a slip event is occurring and will record a degree of slip. TCU 120 then creates a slippage occurrence message. TCU 120 can calculate a decreased current value to supply to first motor 80 to match the speed of first motor 80 with the speed of second motor 90. The steering angle α is not required for this calculation if a non-slip condition is determined or assumed for steerable wheel 28. If a slip condition of steerable wheel 28 is determined, for example by a rate of acceleration of second motor 90 exceeding a predetermined value per unit time, or if a slip condition of steerable wheel 28 is assumed, TCU 120 can further calculate an increased current value to supply to second motor 90 which will reduce or eliminate the slip condition. As identified above, the power steering control unit 88 can then be queried for the value of the steering angle α of steerable wheel 28, and the steering angle α can be included in the calculation of the increased current value to supply to second motor 90.

The turf maintenance vehicle all-wheel drive traction control system 110 of the present disclosure may also prevent an overrun condition. An overrun condition corresponds to increasing wheel slippage of the primary drive wheels 24, 26 in response to user demand coupled with increasing current flow to the motor 90 of the secondary wheel 28 in an attempt to catch up with the slipping primary drive wheels 24, 26. To prevent the overrun condition, TCS 120 can include control logic to indicate when the primary wheels 24, 26 are slipping. The control logic may compare a rate of change of the rotational speed of the primary wheels 24, 26 or of the associated motor 79, by way of non-limiting example, to a predetermined threshold value to ascertain a slipping condition. When the rate exceeds the predetermined threshold value, a slipping condition is present and TCS 120 can decrease the current flow to motor 79 until the rate is below the predetermined threshold value. The operation of secondary wheel 28 will follow when trying to attain a neutral traction state. The predetermined threshold value can be a function of the specific application traction control system 110 is utilized in. The predetermined value is different that the speed threshold limit.

In other embodiments, traction control system 110 may allow non-all-wheel operation of turf maintenance vehicle 10. Specifically, traction control system 10 by allow steerable wheel 28 to be free wheeling such that steerable wheel 28 is not providing any driving force and turf maintenance vehicle 10 is not currently operating in an all-wheel drive mode. When this is the case, second motor 90 is not being continuously energized with electrical current and steerable wheel 28 passively rotates along the surface in response to movement of turf maintenance vehicle 10 being driven by first and second driven wheels 24, 26. Second traction control unit 118 can monitor the rotation of steerable wheel 28, such as by monitoring steerable wheel 28 directly or through second motor 90, while first traction control unit 114 monitors first motor 80 and/or first and second driven wheels 24, 26. TCU 120 can determine a slip condition, as described above. When a slip event is detected by TCU 120, TCU 120 can cause steerable wheel 28 to assist in propelling turf maintenance vehicle 10 by energizing second motor 90 with electric current to provide a driving torque to steerable wheel 28 and/or reduce the current flow to first motor 80, as described above. As a result, turf maintenance vehicle 10 will then operate in an all-wheel drive mode. TCU 120 can also use steering angle α in determining the appropriate response to correct the slipping condition. The all-wheel drive mode can continue until the slip event has been corrected or is no longer present. TCU 120 can then stop continuously energizing second motor 90 and return to a non-all-wheel drive mode. Thus, traction control system 110 can switch operation of turf maintenance vehicle 10 between a non-all-wheel drive mode and an all-wheel mode. The non-all-wheel drive mode may be implemented by TCU 120 to reduce power consumption, increase efficiency, and the like, by way of non-limiting example. The non-all-wheel drive mode may be implemented during steady-state operation.

Figure 7:
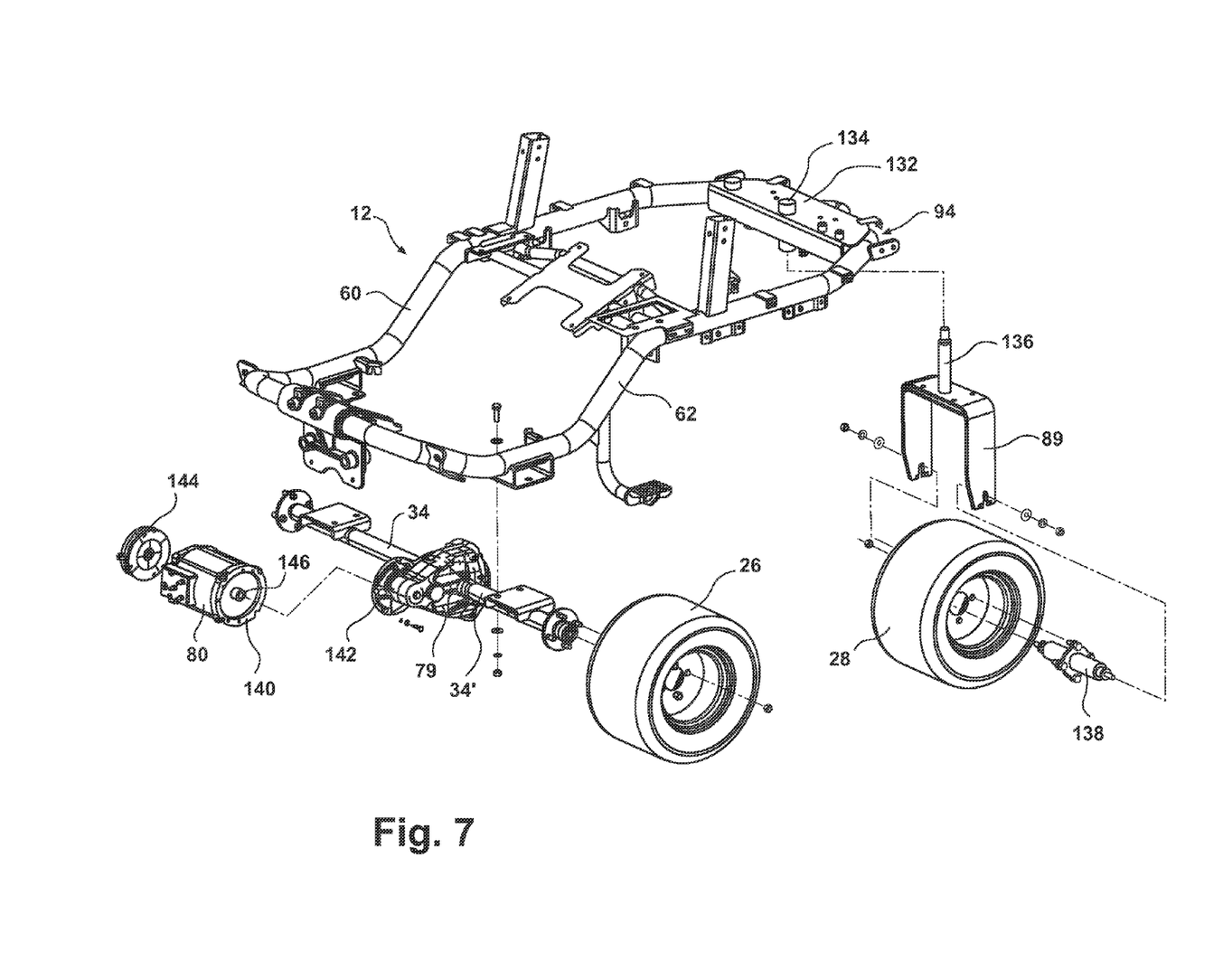
FIG. 7 is a perspective assembly view of the frame and front drive train of the turf maintenance vehicle of the present disclosure.

Referring to FIG. 7, rear frame section 94 connected to frame first and second members 60, 62 of frame 12 can include a support plate 132 having a bearing sleeve 134 provided to rotatably receive a shaft 136 fixedly connected to yoke 89. Shaft 136 is disposed within bearing sleeve 134 allowing rotation of yoke 89. An axle assembly 138 is fastened to steerable wheel 28 and mounted to distal ends of yoke 89. First motor 80 includes a mounting flange 140 adapted to fastenably engage with a receiving flange 142 of differential 79. An electrically controlled brake 144 can be provided for first motor 80 to provide a positive breaking force to prevent rotation of a splined shaft 146 of first motor 80.

Figure 8:
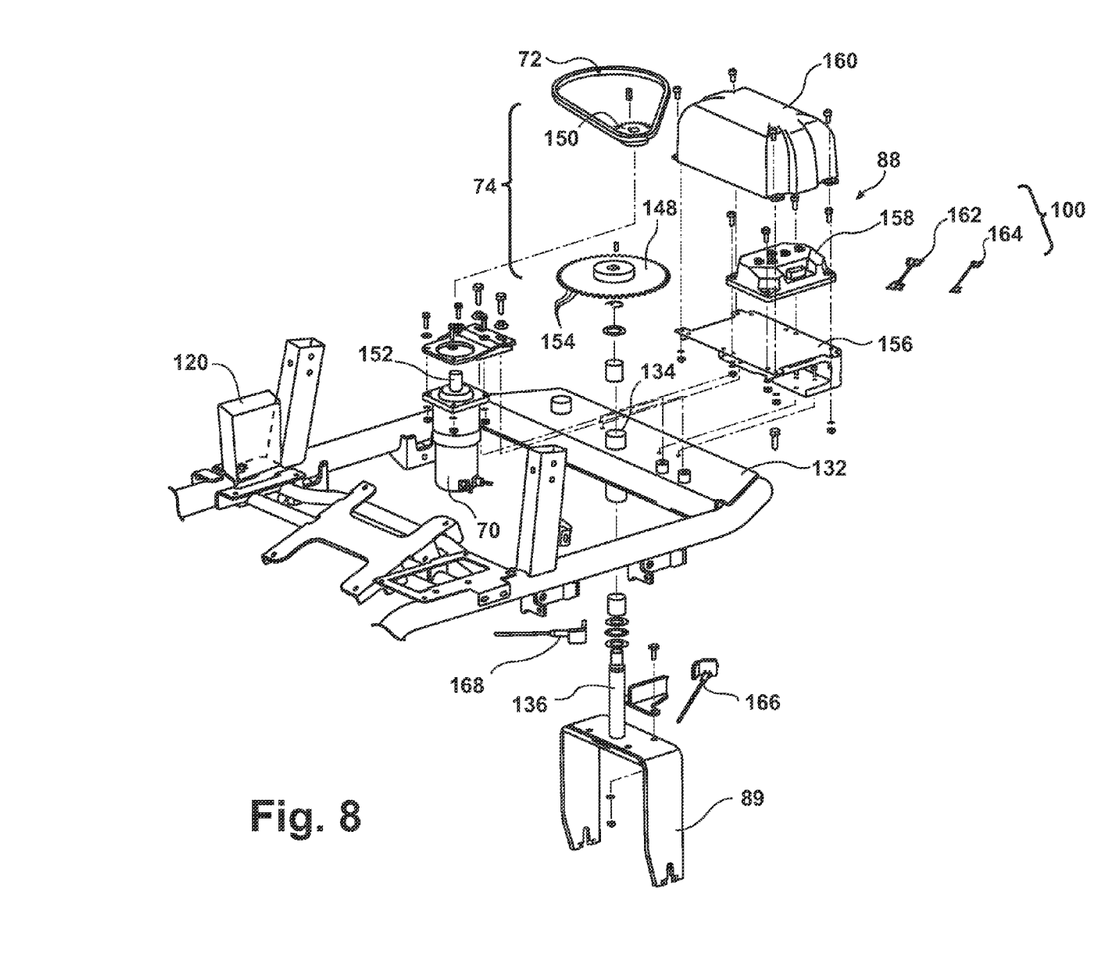
FIG. 8 is a rear portion of the perspective assembly view of FIG. 7 further including power steering and control features of the all-wheel drive system.

Referring to FIG. 8, with shaft 136 positioned within bearing sleeve 134, a toothed sprocket 148 is connected to shaft 136. A toothed gear 150 is connected to an output shaft 152 of drive unit 70 and the chain 72 is engaged between toothed gear 150 and a plurality of teeth 154 of toothed sprocket 148 to rotate yoke 89 by operation of drive unit 70. The location of drive unit 70 varies in this embodiment compared to the embodiment of FIGS. 3 and 4 to demonstrate the flexibility available in locating components of turf maintenance vehicle 10 for example to provide multiple models, or to suit use of either engine 65 or battery unit 102 shown in FIG. 5. A weldment bracket 156 can be welded or as shown fastened to support plate 132. Weldment bracket 156 is adapted to receive a circuit board and hardware assembly 158 of power steering control unit 88. A cover 160 is provided to protect assembly 158. A steering motor harness 162 and a steering power harness 164 provide data communication and power to drive unit 70 via one of the plurality of wiring harnesses 100. Location indication devices such as first and second proximity switches 166, 168 can be mounted on yoke 89 and/or local structure of frame 12 and adapted to provide signals to de-energize drive unit 70 when maximum rotation points for yoke 89 are reached. A location for TCU 120 is also shown. This location can also vary at the discretion of the manufacturer for the same reasons noted above for drive unit 70.

The turf maintenance vehicle all-wheel drive traction control system of the present disclosure offers several advantages. By using a first electric motor to drive primary wheels and a second electric motor to drive a secondary wheel, both the primary and secondary motors are continuously energized (in the all-wheel drive mode) allowing rapid change to the first and/or second motors to recover from a primary wheel slip condition. Because the secondary wheel is normally in an energized but neutral traction state, it mimics the operating speed of the primary wheels. A current flow to the second motor can therefore be increased independently of the current flow to the first motor to recover from the primary wheel slip condition. The all electric motor drive of the all-wheel drive traction control system also permits use of either a motor/generator set for propulsion power or a battery pack for propulsion power. By including a secondary wheel rotational angle in the control system, the amount of current flow to the second motor can be further controlled to reduce or minimize secondary wheel slip or forced vehicle turn if the secondary wheel is in a rotated or turned state when the slip condition occurs.

It should be appreciated that the all-wheel drive traction control system of the present disclosure is also applicable to turf maintenance vehicles wherein there are multiple primary drive wheels that are operable independently of one another. For example, each primary drive wheel can have an associated electric motor that only drives that wheel. In this case, TCU 120 may detect a slipping condition for any individual wheel (based on a current demand, motor rotational acceleration value, motor rotational speed change rate, motor rotational acceleration change rate, and the like) and make the appropriate changes in the current flow to the motors (primary and/or secondary), as described above, to stop the slipping condition. It should also be appreciated, however, that with such a configuration all of the advantages of the present disclosure may not be realized due to the increased complexity, cost, and the like.

What is claimed is:

1. A turf maintenance vehicle, comprising:
at least one front driven wheel propelling the turf maintenance vehicle;
a first motor receiving current and rotating the front driven wheel;
a traction control system in communication with the first motor;
at least one rear steerable wheel to steer the turf maintenance vehicle; and
a second motor rotatably connected to the at least one rear steerable wheel and energized by a current to rotate the at least one rear steerable wheel,
wherein a steering angle of the at least one rear steerable wheel is determined based on an angle of wheel rotation of the at least one rear steerable wheel;
wherein i) the current to the first motor is temporarily decreased and ii) the current to the second motor is temporarily increased by the traction control system in response to a wheel slip condition of the front driven wheel and the steering angle of the at least one rear steerable wheel.

2. The turf maintenance vehicle of claim 1, further including a first signal from the first motor monitored by the traction control system.

3. The turf maintenance vehicle of claim 2, further including a predetermined speed threshold limit saved in the traction control system, wherein occurrence of the wheel slip condition of the front driven wheel is identified by the traction control system when the first signal exceeds the predetermined speed threshold limit.

4. The turf maintenance vehicle of claim 3, further including a rate of acceleration of the second motor sensed by the traction control system operating to increase the current to the second motor to recover from the wheel slip condition.

5. The turf maintenance vehicle of claim 2, further including the steering angle of the at least one rear steerable wheel provided as an input to the traction control system.

6. The turf maintenance vehicle of claim 2, wherein the first signal is a current demand value of the first motor.

7. The turf maintenance vehicle of claim 2, wherein the first signal is a motor rotational acceleration value of the first motor.

8. The turf maintenance vehicle of claim 1, further including a second portion of the traction control system operating to monitor the steering angle of the at least one rear steerable wheel and a second signal.

9. The turf maintenance vehicle of claim 8, wherein the current to the second motor decreases as the steering angle decreases to a null position, and increases as the steering angle increases with respect to the null position.

10. The turf maintenance vehicle of claim 8, wherein the second signal is a current demand value of the second motor.

11. The turf maintenance vehicle of claim 8, wherein the second signal is a motor rotational acceleration value of the second motor.

12. The turf maintenance vehicle of claim 1, wherein the current to the second motor is temporarily increased by the traction control system in response to a wheel slip condition of the front driven wheel.

13. The turf maintenance vehicle of claim 1, wherein the second motor is continuously energized by a current to rotate the at least one rear steerable wheel.

14. A turf maintenance vehicle, comprising:
at least one front driven wheel;
a first motor rotating the front driven wheel, the first motor producing a first signal;
a traction control system in communication with the first motor, the traction control system storing a speed threshold limit and a predetermined speed value;
at least one rear steerable wheel steering the turf maintenance vehicle; and
a second motor rotating the at least one rear steerable wheel,
wherein a steering angle of the at least one rear steerable wheel is determined based on an angle of wheel rotation of the at least one rear steerable wheel;
wherein a speed of the second motor is temporarily increased and a speed of the first motor is temporarily decreased by the traction control system, based on the steering angle of the at least one rear steerable wheel, when the speed threshold limit compared to the first signal exceeds the predetermined value indicating a wheel slip condition of the front driven wheel.

15. The turf maintenance vehicle of claim 14, further comprising a slippage occurrence message indicative of a slip event of the front driven wheel generated by the traction control system when the speed threshold limit compared to the first signal exceeds the predetermined value.

16. The turf maintenance vehicle of claim 14, further comprising a current to the second motor operating to continuously energize the second motor to rotate the at least one rear steerable wheel.

17. The turf maintenance vehicle of claim 16, wherein a speed of the second motor is temporarily increased by the traction control system when the speed threshold limit compared to the first signal exceeds the predetermined value indicating a wheel slip condition of the front driven wheel.

* * * * *